United States Patent
Chen et al.

(10) Patent No.: US 10,360,353 B2
(45) Date of Patent: Jul. 23, 2019

(54) EXECUTION CONTROL OF COMPUTER SOFTWARE INSTRUCTIONS

(71) Applicant: INTERNATIONAL BUSINESS MACHINES CORPORATION, Armonk, NY (US)

(72) Inventors: Ben Chen, Herzeliya (IL); Amir Glaser, Jerusalem (IL); Roman Minkov, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 233 days.

(21) Appl. No.: 15/427,248

(22) Filed: Feb. 8, 2017

(65) Prior Publication Data

US 2018/0225430 A1 Aug. 9, 2018

(51) Int. Cl.
*G06F 7/04* (2006.01)
*G06F 21/12* (2013.01)
*G06F 8/70* (2018.01)
*G06F 21/52* (2013.01)

(52) U.S. Cl.
CPC .............. *G06F 21/123* (2013.01); *G06F 8/70* (2013.01); *G06F 21/52* (2013.01)

(58) Field of Classification Search
USPC .................................................... 726/28, 27
See application file for complete search history.

(56) References Cited

U.S. PATENT DOCUMENTS

| | | | | |
|---|---|---|---|---|
| 7,206,925 | B1* | 4/2007 | Jacobson | G06F 9/30043 712/225 |
| 7,401,358 | B1* | 7/2008 | Christie | G06F 9/4403 711/163 |
| 7,748,037 | B2* | 6/2010 | Rajagopal | G06F 12/1491 711/163 |
| 7,818,625 | B2* | 10/2010 | LeBlanc | G06F 11/2268 714/40 |
| 7,818,808 | B1* | 10/2010 | Neiger | G06F 12/145 703/27 |
| 8,127,098 | B1* | 2/2012 | Klaiber | G06F 9/45533 711/151 |
| 8,955,057 | B2 | 2/2015 | Desai et al. | |
| 9,027,003 | B2* | 5/2015 | Weissman | G06F 9/455 717/128 |
| 9,128,738 | B2 | 9/2015 | Iwata | |
| 9,201,689 | B2* | 12/2015 | Scott | G06F 9/4881 |

(Continued)

FOREIGN PATENT DOCUMENTS

WO WO2013093209 A1 6/2013

*Primary Examiner* — Amare F Tabor
(74) *Attorney, Agent, or Firm* — William Kinnaman, Esq.; Kevin P. Radigan, Esq.; Heslin Rothenberg Farley & Mesiti P.C.

(57) ABSTRACT

Execution control of computer software instructions. A determination is made as to whether a record exists that indicates an outcome of a previous attempt to execute a computer software instruction in a first execution privilege mode. A current attempt to execute the computer software instruction is controlled by causing the current attempt to execute the computer software instruction in a second execution privilege mode if the record exists and if the outcome indicates that the attempt to execute the computer software instruction in the first execution privilege mode failed.

20 Claims, 3 Drawing Sheets

(56) References Cited

U.S. PATENT DOCUMENTS

| | | |
|---|---|---|
| 9,323,533 B2* | 4/2016 | Ven .................... G06F 9/30043 |
| 9,325,721 B2 | 4/2016 | Begum et al. |
| 2008/0216175 A1* | 9/2008 | Pike ....................... G06F 21/52 |
| | | 726/22 |
| 2009/0249442 A1 | 10/2009 | Birgen et al. |
| 2010/0132053 A1 | 5/2010 | Chishima |
| 2012/0042154 A1* | 2/2012 | Grisenthwaite ..... G06F 9/30101 |
| | | 712/229 |
| 2012/0216281 A1* | 8/2012 | Uner ....................... G06F 21/50 |
| | | 726/23 |

* cited by examiner

EXECUTION CONTROL OF COMPUTER SOFTWARE INSTRUCTIONS

BACKGROUND

Various computer operating systems have "privileged" and "non-privileged" modes for executing various software instructions, where a software instruction that requires a "privileged" execution mode will fail to execute if a computer user or a computer software application attempts to execute the software instruction in a "non-privileged" mode, or attempts to execute the software instruction in a "privileged" mode but is not authorized to do so. For example, the "shutdown" command of the LINUX operating system is typically designated as a "privileged" command, and thus any software instruction that includes the "shutdown" command must be executed in a "privileged" mode, such as by including the LINUX "su" or "sudo" commands within the software instruction.

While some commands are typically designated by default as "privileged" and some as "non-privileged," these designations may be overridden by a system administrator. Furthermore, some "non-privileged" commands may sometimes require execution in a "privileged" mode. For example, the LINUX "cat" command is typically designated as a "non-privileged" command, but a software instruction that includes the "cat" command must be executed in a "privileged" mode if it is used to access a file to which the computer user or computer software application does not have READ access, although this requirement, too, may be overridden by a system administrator. Thus, software instructions that include commands that are typically designated as "privileged" commands may sometimes be executed in a "non-privileged" mode, and software instructions that include commands that are typically designated as "non-privileged" commands may sometimes require execution in a "privileged" mode.

SUMMARY

Shortcomings of the prior art are overcome and additional advantages are provided through the provision of a computer-implemented method of execution control of computer software instructions. The computer-implemented method includes determining whether a record exists that indicates an outcome of a previous attempt to execute a computer software instruction in a first execution privilege mode; and controlling a current attempt to execute the computer software instruction. The controlling causing the current attempt to execute the computer software instruction in a second execution privilege mode based on the record existing and the outcome indicating that the previous attempt to execute the computer software instruction in the first execution privilege mode failed.

Systems and computer program products relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

Aspects of the invention will be understood and appreciated more fully from the following detailed description taken in conjunction with the appended drawings in which.

DETAILED DESCRIPTION

The term "software instruction" as used herein refers to an instance of the use of one or more software command terms together with zero or more operators, operands, or other modifiers, such as may be invoked by a computer user or found within a computer software application.

Figure 1:
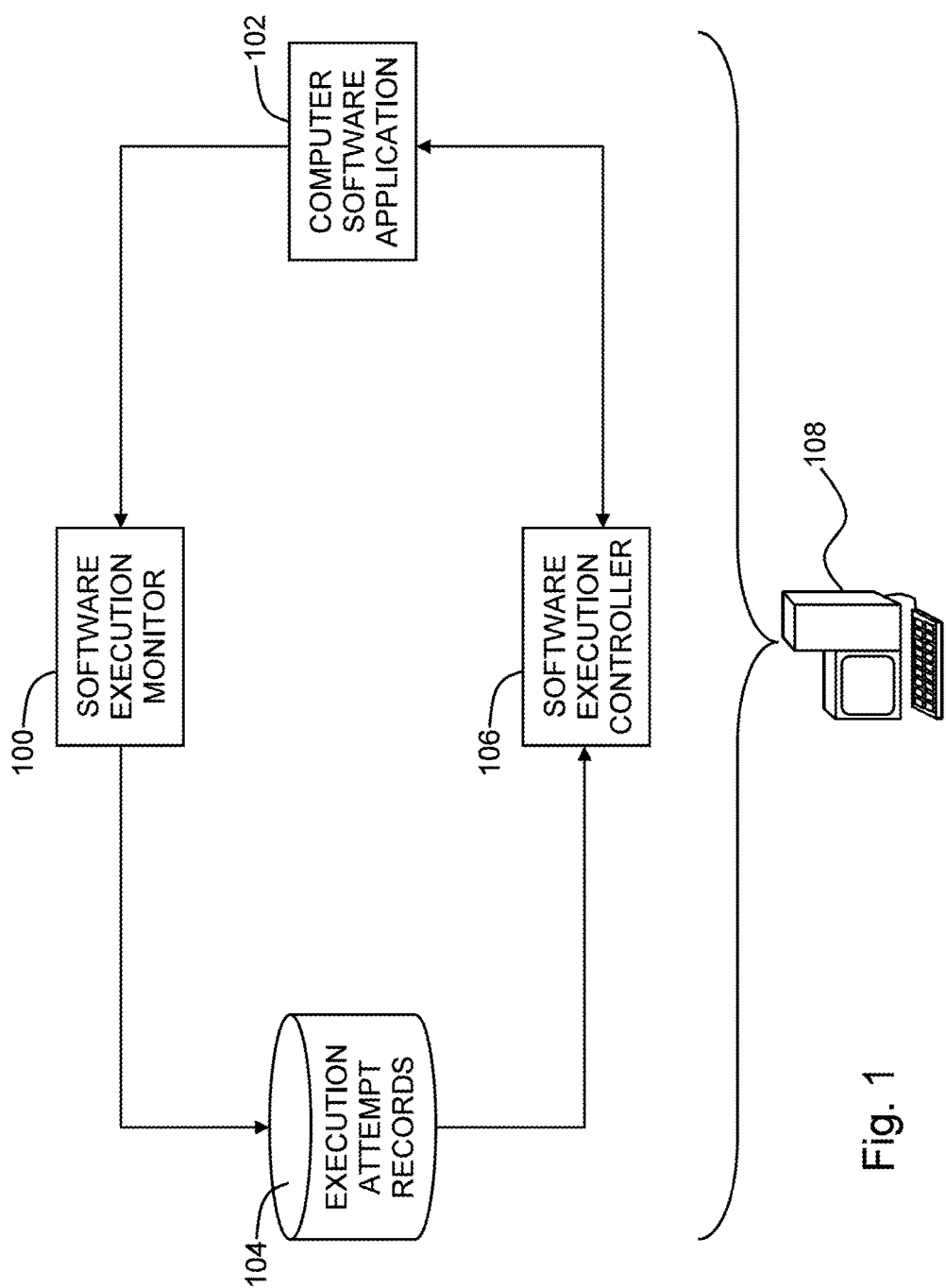
FIG. 1 is a conceptual illustration of a system for execution control of computer software instructions, constructed and operative in accordance with an embodiment of the invention.

Reference is now made to FIG. 1, which is a conceptual illustration of a system for execution control of computer software instructions, constructed and operative in accordance with an embodiment of the invention. In the system of FIG. 1, a software execution monitor 100 is configured, in accordance with one or more techniques, to monitor attempts to execute various computer software instructions, such as a computer software application 102, and create and maintain records 104 of the execution attempts. Software execution monitor 100 is configured, in one example, to record the outcome of an attempt to execute a computer software instruction by including in an associated execution attempt record 104 an indication of whether the attempt to execute the computer software instruction succeeded or failed, as well an indication of the execution privilege mode in which the attempt was made, such as where the execution privilege mode is either a "privileged" execution mode or a "non-privileged" execution mode, or is an equivalent of one of these modes, where such execution modes or their equivalents are known features of various computer operating systems, such as LINUX. Software execution monitor 100 is also configured, in one embodiment, to include in each execution attempt record 104 an identifier associated with the computer that attempted to execute the computer software instruction associated with execution attempt record 104. In various embodiments, execution attempt records 104 are maintained only for failed execution attempts, only for successful execution attempts, or for both successful and failed execution attempts. In one embodiment, an execution attempt record 104 to record the outcome of an attempt to execute a computer software instruction is not created if an execution attempt record 104 already exists for a previous execution attempt of the computer software instruction that indicates the same outcome for the same execution privilege mode on the same computer.

A software execution controller 106 is configured, in accordance with one or more techniques, to detect a current attempt to execute a computer software instruction on a particular computer, such as immediately prior to the current attempt when the computer software instruction is encountered during the execution by the particular computer of computer software application 102 that includes the computer software instruction. Software execution controller 106 is also configured to determine whether an execution attempt record 104 exists that indicates an outcome of a previous attempt to execute the computer software instruction on the particular computer. Software execution controller 106 is configured to control the current attempt to execute the computer software instruction on the particular computer by causing the current attempt to execute the computer software instruction in a particular execution privilege mode. In one embodiment, if an execution attempt record 104 does not exist that indicates an outcome of a previous attempt to execute the computer software instruction on the particular computer, software execution controller 106 is configured to cause the current attempt to execute the computer software instruction in whatever execution privilege mode is currently applicable to the computer software instruction. In another embodiment, if such an execution attempt record 104 does not exist, software execution controller 106 is configured to cause the current attempt to execute the computer software instruction in a default execution privilege mode, such as in a "non-privileged" execution privilege mode. In another embodiment, if such an execution attempt record 104 does exist, and the execution attempt record 104 indicates that a previous attempt to execute the computer software instruction in a particular execution privilege mode failed, software execution controller 106 is configured to cause the current attempt to execute the computer software instruction in a different execution privilege mode than the execution privilege mode in which the previous attempt failed. In another embodiment, if such an execution attempt record 104 does exist, and the execution attempt record 104 indicates that a previous attempt to execute the computer software instruction in a particular execution privilege mode succeeded, software execution controller 106 is configured to cause the current attempt to execute the computer software instruction in the same execution privilege mode as the execution privilege mode in which the previous attempt succeeded.

Any of the elements shown in FIG. 1 are implemented, for instance, by one or more computers in computer hardware and/or in computer software embodied in a non-transitory, computer-readable medium in accordance with conventional techniques, such as where any of the elements shown in FIG. 1 are hosted by a computer 108.

Figure 2:
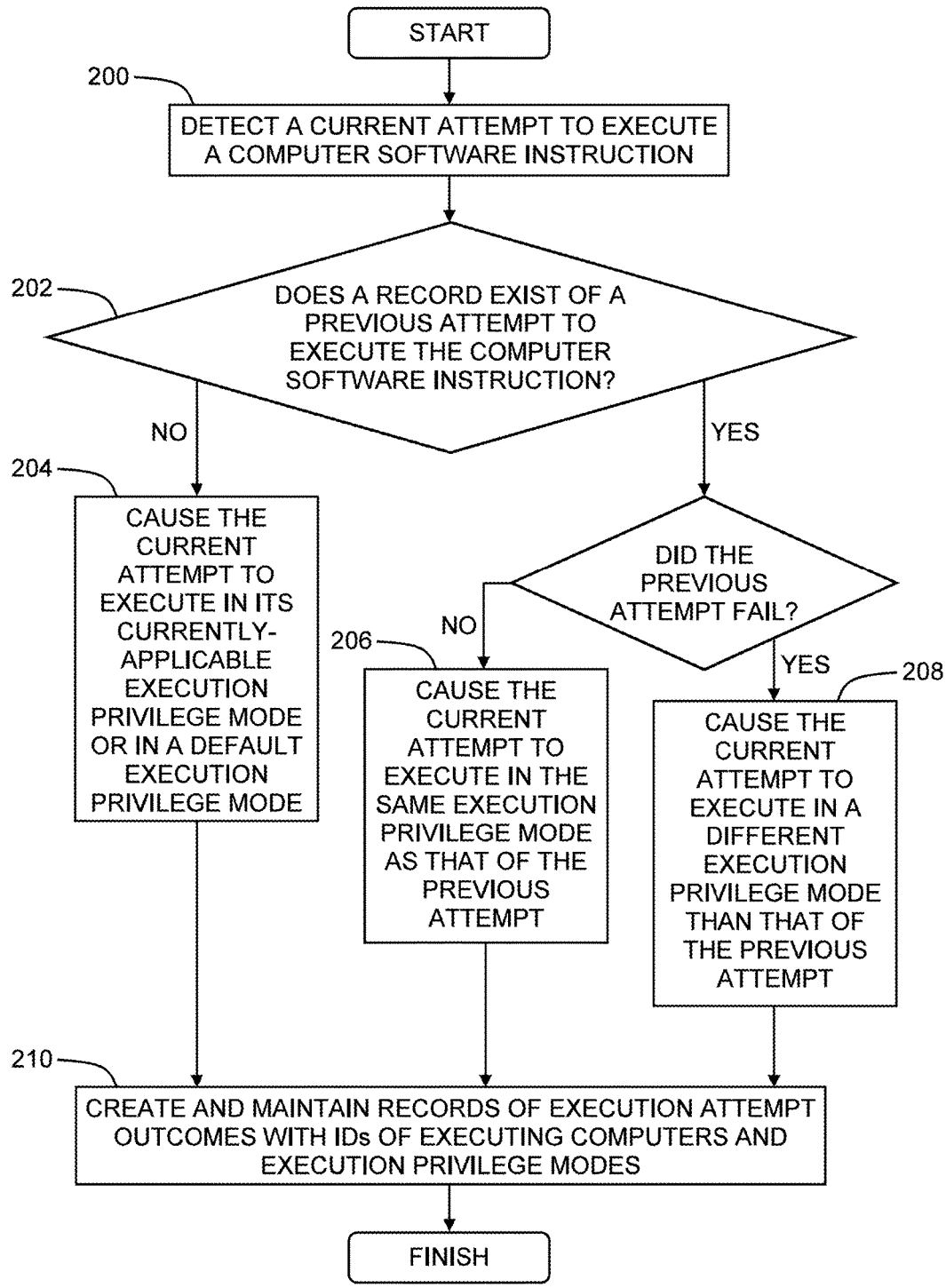
FIG. 2 is a flowchart illustration of an example method of operation of the system of FIG. 1, operative in accordance with various embodiments of the invention.

Reference is now made to FIG. 2, which is a flowchart illustration of an example method of operation of the system of FIG. 1, operative in accordance with an embodiment of the invention. In the method of FIG. 2, a current attempt to execute a computer software instruction on a particular computer is detected (step 200). It is then determined whether an execution attempt record exists that indicates an outcome of a previous attempt to execute the computer software instruction on the particular computer (step 202). If the record does not exist, the current attempt is controlled by causing the current attempt to execute the computer software instruction on the particular computer in its currently-applicable execution privilege mode or in a default execution privilege mode (step 204), such as in a "non-privileged" execution privilege mode. If the record exists and indicates that a previous attempt to execute the computer software instruction in a particular execution privilege mode failed, the current attempt is controlled by causing the current attempt to execute the computer software instruction on the particular computer in a different execution privilege mode than the execution privilege mode in which the previous attempt failed (step 208). If the record exists and indicates that a previous attempt to execute the computer software instruction in a particular execution privilege mode succeeded, the current attempt is controlled by causing the current attempt to execute the computer software instruction on the particular computer in the same execution privilege mode as the execution privilege mode in which the previous attempt succeeded (step 206). Records of failed and/or successful execution attempts are created and maintained, where each such record indicates, for instance, the success or failure of its associated execution attempt, an indication of the execution privilege mode in which the attempt was made, and an identifier associated with the computer that attempted to execute the computer software instruction (step 210).

In one embodiment, aspects of the system of FIG. 1 and the method of FIG. 2 are implemented by a computer programmer within a computer software application, where any of the instructions of the computer software application are designated by the computer programmer for processing as described hereinabove proximate to their execution. In various other embodiments, aspects of the system of FIG. 1 and the method of FIG. 2 are implemented by a computer operating system upon receiving a request from a computer software application or from a computer user, or by a computer software application that, in accordance with one or more techniques, intercepts such requests that are received by a computer operating system and processes such requests as described hereinabove proximate to their execution by the computer operating system.

Figure 3:
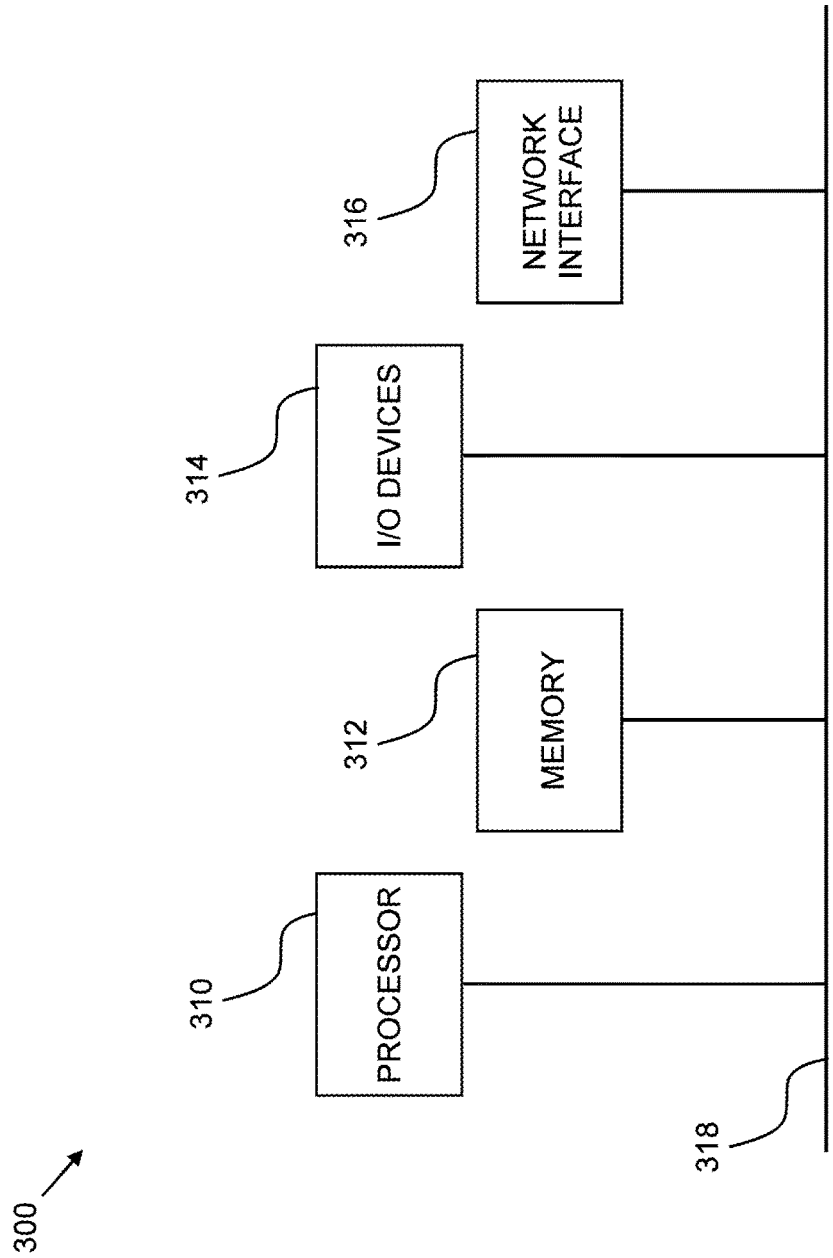
FIG. 3 is a block diagram illustration of an example hardware implementation of a computing system, constructed and operative in accordance with an embodiment of the invention

Referring now to FIG. 3, a block diagram 300 illustrates an example hardware implementation of a computing system in accordance with which one or more components/methodologies of aspects of the invention (e.g., components/methodologies described in the context of FIGS. 1-2) may be implemented, according to an embodiment of the invention. As shown, one or more aspects of the invention may be implemented in accordance with a processor 310, a memory 312, I/O devices 314, and a network interface 316, coupled via a computer bus 318 or an alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

As described herein, in one aspect of the invention, a method is provided for execution control of computer software instructions. The method includes determining whether a record exists that indicates an outcome of a previous attempt to execute a computer software instruction in a first execution privilege mode, and controlling a current attempt to execute the computer software instruction by causing the current attempt to execute the computer software instruction in a second execution privilege mode if the record exists and if the outcome indicates that the attempt to execute the computer software instruction in the first execution privilege mode failed.

In other aspects of the invention, systems and computer program products embodying the invention are provided.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer-implemented method of execution control of computer software instructions, the computer-implemented method comprising:
maintaining records of attempts to execute a computer software instruction, the records comprising:
outcomes of the attempts;
privilege modes of the attempts; and
identifiers identifying computers that attempt to execute the computer software instruction;
identifying a particular computer performing a current attempt to execute the computer software instruction, the identifying referencing an identifier associated with the particular computer;
determining, based on the identifying, whether a record exists that indicates an outcome of a previous attempt to execute the computer software instruction in a first execution privilege mode, the previous attempt having been performed by the particular computer; and
controlling the current attempt to execute the computer software instruction, the controlling causing the current attempt to execute the computer software instruction in a second execution privilege mode based on the record existing and the outcome of the previous attempt indicating that the previous attempt to execute the computer software instruction in the first execution privilege mode failed.

2. The computer-implemented method according to claim 1, wherein the controlling the current attempt to execute the computer software instruction comprises causing the current attempt to execute the computer software instruction in the first execution privilege mode based on the record not existing.

3. The computer-implemented method according to claim 1, wherein the controlling the current attempt to execute the computer software instruction comprises causing the current attempt to execute the computer software instruction in the first execution privilege mode based on the record existing and the outcome indicating that the previous attempt to execute the computer software instruction in the first execution privilege mode succeeded.

4. The computer-implemented method according to claim 1, wherein the first execution privilege mode is a non-privileged execution mode and the second execution privilege mode is a privileged execution mode.

5. The computer-implemented method according to claim 1, further comprising creating the record that indicates the outcome of the previous attempt to execute the computer software instruction in the first execution privilege mode.

6. The computer-implemented method according to claim 1, further comprising creating a record that indicates an outcome of the current attempt to execute the computer software instruction in the second execution privilege mode.

7. The computer-implemented method according to claim 1, wherein the determining and the controlling are implemented in computer hardware.

8. A computer system for executing control of computer software instructions, the computer system comprising:
a memory; and
a processor in communication with the memory, wherein the computer system is configured to perform a method, the method comprising:
maintaining records of attempts to execute a computer software instruction, the records comprising:
outcomes of the attempts;
privilege modes of the attempts; and
identifiers identifying computers that attempt to execute the computer software instruction;
identifying a particular computer performing a current attempt to execute the computer software instruction, the identifying referencing an identifier associated with the particular computer;
determining, based on the identifying, whether a record exists that indicates an outcome of a previous attempt to execute the computer software instruction in a first execution privilege mode, the previous attempt having been performed by the particular computer; and
controlling the current attempt to execute the computer software instruction, the controlling causing the current attempt to execute the computer software instruction in a second execution privilege mode based on the record existing and the outcome of the previous attempt indicating that the previous attempt to execute the computer software instruction in the first execution privilege mode failed.

9. The computer system according to claim 8, wherein the controlling the current attempt to execute the computer software instruction comprises causing the current attempt to execute the computer software instruction in the first execution privilege mode based on the record not existing.

10. The computer system according to claim 8, wherein the controlling the current attempt to execute the computer software instruction comprises causing the current attempt to execute the computer software instruction in the first execution privilege mode based on the record existing and the outcome indicating that the previous attempt to execute the computer software instruction in the first execution privilege mode succeeded.

11. The computer system according to claim 8, wherein the first execution privilege mode is a non-privileged execution mode and the second execution privilege mode is a privileged execution mode.

12. The computer system according to claim 8, wherein the method further comprises creating the record that indicates the outcome of the previous attempt to execute the computer software instruction in the first execution privilege mode.

13. The computer system according to claim 8, wherein the method further comprises creating a record that indicates an outcome of the current attempt to execute the computer software instruction in the second execution privilege mode.

14. The computer system according to claim 8, wherein the determining and the controlling are implemented in computer hardware.

15. A computer program product for executing control of computer software instructions, the computer program product comprising:
a computer readable storage medium readable by a processing circuit and storing instructions for performing a method comprising:
maintaining records of attempts to execute a computer software instruction, the records comprising:
outcomes of the attempts;
privilege modes of the attempts; and identifiers identifying computers that attempt to execute the computer software instruction;

identifying a particular computer performing a current attempt to execute the computer software instruction, the identifying referencing an identifier associated with the particular computer;

determining, based on the identifying, whether a record exists that indicates an outcome of a previous attempt to execute the computer software instruction in a first execution privilege mode, the previous attempt having been performed by the particular computer; and controlling the current attempt to execute the computer software instruction, the controlling causing the current attempt to execute the computer software instruction in a second execution privilege mode based on the record existing and the outcome of the previous attempt indicating that the previous attempt to execute the computer software instruction in the first execution privilege mode failed.

16. The computer program product according to claim 15, wherein the controlling the current attempt to execute the computer software instruction comprises causing the current attempt to execute the computer software instruction in the first execution privilege mode based on the record not existing.

17. The computer program product according to claim 15, wherein the controlling the current attempt to execute the computer software instruction comprises causing the current attempt to execute the computer software instruction in the first execution privilege mode based on the record existing and the outcome indicating that the previous attempt to execute the computer software instruction in the first execution privilege mode succeeded.

18. The computer program product according to claim 15, wherein the first execution privilege mode is a non-privileged execution mode and the second execution privilege mode is a privileged execution mode.

19. The computer program product according to claim 15, wherein the method further comprises creating the record that indicates the outcome of the previous attempt to execute the computer software instruction in the first execution privilege mode.

20. The computer program product according to claim 15, wherein the method further comprises creating a record that indicates an outcome of the current attempt to execute the computer software instruction in the second execution privilege mode.

* * * * *